United States Patent Office 3,684,553
Patented Aug. 15, 1972

3,684,553
PROCESS FOR REMOVING SURFACE DEFECTS FROM ARTICLES HAVING A THERMOPLASTIC SURFACE
John W. Van Dyk, Wilmington, Del., assignor to E. I. du Pont de Nemours and Company, Wilmington, Del.
No Drawing. Continuation-in-part of application Ser. No. 733,276, May 31, 1968. This application Dec. 14, 1970, Ser. No. 98,049
Int. Cl. B44d 1/44; B23p 7/00
U.S. Cl. 117—63                                   6 Claims

ABSTRACT OF THE DISCLOSURE

A process for treating an article that has an essentially thermoplastic polymer surface to remove defects from the surface which comprises:
(1) Exposing the polymer surface of the article to a partial pressure of a viscosity reducing vapor for the polymer; and
(2) Absorbing sufficient vapor into the polymer surface of the article to reduce the viscosity of the polymer to allow the polymer to flow to form a smooth even surface.

CROSS REFERENCE TO RELATED APPLICATIONS

This is a continuation-in-part application of my copending application Ser. No. 733,276, filed May 31, 1968, now abandoned.

BACKGROUND OF THE INVENTION

This invention is related to a process for treating an article having a thermoplastic polymer surface to improve the appearance of the article.

There are several methods taught in the art for improving the appearance of an article coated with a thermoplastic polymer by treating the article with a vapor which is a solvent for the polymer. For example, Peters U.S. Pat. 2,294,479, issued Sept. 1, 1942, teaches a process for polishing a nitrocellulose coating of an article by momentarily exposing the coating to an atmosphere of concentrated solvent vapors. Motter U.S. Pat. 2,771,378, issued Nov. 20, 1956, is directed to a process for forming a mar resistant methacrylate polymer coating by exposing the coating to a mixture of vapors of a volatile organic solvent and silicon tetrachloride. Koch et al. U.S. 3,327,033, issued June 20, 1967, though not directed to a process for producing and improving the surface characteristics of a polymer coated article teaches a process for forming a partially crystalline polycarbonate film by contacting the film with solvent vapors.

The above processes are often deficient since they rely either on condensation of the solvent vapors on the coating or on a very short critical exposure time to the vapors. Both of these methods are very difficult to control. The above prior art processes often result in completely dissolving the polymeric coating on the article or cause sagging of the coating due to excess solvent or result in an incomplete treatment in which there is little or no improvement in the appearance of the surface coating.

One particular area which has a high appearance standard for coatings is the automotive industry. The acrylic polymers used as topcoats for auto bodies present special problems and the aforementioned prior art processes simply cannot be used, particularly on a large volume production line basis to form coatings which are even, smooth and free from surface defects.

The novel process of this invention does not condense the solvent vapors on the polymer surface of the articles being treated since the partial pressure of the viscosity reducing vapor for the polymer is held below the saturation vapor pressure. A short critical exposure time to the solvent vapor is not required in the process of this invention since the partial pressure of the solvent vapors is held below the saturation pressure and an excess of solvent is not absorbed into the polymeric surface. In the process of this invention, only a sufficent amount of vapor is absorbed into the polymer surface coating to allow the polymer to reflow and not sag or dissolve as often occurs with the prior art methods. Moreover, the novel process of this invention is particularly applicable for acrylic polymer coatings and has practical utility in the automotive industry which has very high standards of appearance for the coatings applied to auto bodies.

STATEMENT OF THE INVENTION

A process for treating an article that has an essentially thermoplastic polymer surface that comprises:
(1) Exposing the polymer surface of the article to a partial pressure of a viscosity reducing vapor for the polymer, the partial pressure range of the vapor is at least 0.5 inch of mercury and up to 0.99 times the saturation vapor pressure determined at the temperature at which the article is being exposed;
(2) Absorbing sufficient vapor into the polymer surface of the article to reduce the viscosity of the thermoplastic polymer surface of the article to a viscosity of 100,000–2,000,000 poises; and
(3) Allowing the polymer to reflow to form a smooth, even surface.

DESCRIPTION OF THE INVENTION

"Essentially thermoplastic" as used herein refers to a polymer that is primarily linear in structure, but can be cross-linked to a slight degree, and to a polymer that may be softened by heat but will regain its original properties on cooling. The term also includes graft copolymers.

Viscosity reducing vapor is a vapor that can be absorbed into the coating and will lower the viscosity of the polymer surface to such a degree to allow the polymer at the surface to reflow to form a smooth, even, mar and scratch-free surface. The vapor in the liquid form need not be, but preferably is, a good solvent for the thermoplastic polymer, but the vapor only need be soluble to a sufficient degree in the polymer surface to cause reflow of the polymer. Sufficient vapors should be absorbed to reduce the viscosity, determined at a low shear rate, of the polymer surface to about 100,000–2,000,000 poises. This will allow the polymer to reflow to form a smooth, even, mar-free surface. To obtain particularly good results, the viscosity of the polymer surface should be reduced to about 500,000–1,000,000 poises.

To avoid condensation of the viscosity reducing vapor on the article being treated, the partial pressure of the vapor is held between 0.5 inch of mercury (Hg) and 0.99 times the saturation vapor pressure. The saturation vapor pressure is determined at the temperature at which the article is being treated which, preferably, is about 20° C.–200° C., and more preferably, about 25–100° C. Also, to avoid condensation of the vapor, the article being treated should be at the temperature of the vapor or at a slightly higher temperature.

The preferred partial pressure used in the process is at least 5 inches of mercury and up to 0.97 times the saturation vapor pressure since this range gives a high quality product. This preferred partial pressure range usually is about 5–25 inches Hg for most solvents.

The time the article is exposed to the viscosity reducing vapor is preferably about 15 seconds–2 hours, and more preferably, 30 seconds–5 minutes for most solvents. The time of exposure to the vapor atmosphere is determined by the rate at which the vapors are absorbed into the polymeric surface of the article.

A partial pressure for this solvent used at the temperature at which the article is being exposed is selected to produce optimum results by simple experimentation which is familiar to anyone skilled in the art. For best results it is preferred to closely control the partial pressure of the solvent to about ±3% of the above selected value. However, the partial pressure should not exceed aforementioned range of 0.99 times the saturation vapor pressure or drop below 0.5 inch of mercury. By closely controlling the partial pressure near its optimum value, condensation of solvent vapors on the polymer surface is eliminated and the products resulting from this process have a smooth, even polymeric surface.

Another method for exposing the article to solvent vapors which may under certain conditions have advantages is to introduce the solvent vapor at a low partial pressure and then increase the partial pressure to an optimum value which does not exceed 0.99 times the saturation vapor pressure.

After the polymer surface of the article has been exposed, it is dried at room temperature or preferably at 65–150° C. for about 1 minute–1 hour. Optimum drying conditions vary from polymer to polymer and for different solvents can be easily determined by one skilled in the art.

The type of viscosity reducing vapor used depends on the polymer surface o f the article. The type of vapor necessary and preferred for a particular polymer can be readily determined by one skilled by a simple experimentation. The following are typical solvents which when vaporized to give a partial pressure within the aforementioned limits can be used in the novel process of this invention with a wide variety of polymers that form the surface of the article being treated: methylene chloride, acetone, benzene, acetonitrile, tetrahydrofuran, methanol, chloroform, carbon tetrachloride, dichloroethane, trichloroethylene, tetrachlooroethylene, 1,1,2-trichloroethane, 1,1,1-trichloroethane, ethyl acetate, butyl acetate, methyl methacrylate, toluene, methyl isobutyl ketone, dimethyl formamide, dimethyl acetamide, trifluoroacetic acid, Cellosolve acetate, methyl Cellosolve acetate, and mixtures of the above solvents. As a safety precaution, water vapor, nitrogen and other inert gases can be used as the diluent gas.

One preferred solvent blend used in the novel process of this invention contains about 80–90% by volume methylene chloride, 5–10% by volume methyl Cellosolve acetate and 5–10% by volume Cellosolve acetate.

The novel process of this invention can be used to remove the surface defects of formed thermoplastic objects, such as combs, brushes, toys, parts for autos, airplanes, machinery and the like. Typical thermoplastic polymers used to make these objects are, for example, polystyrene, polyesters, polyamides, polycarbonates, polymethyl methacrylate, copolymers of methyl methacrylate and lower alkyl methacrylates, butadiene-acrylonitrile copolymers, styrene copolymers, polyacrylonitrile, and other copolymers thereof, polyvinyl chloride, copolymer of vinyl chloride-vinyl acetate, ethylene-vinyl acetate copolymers, nitrocellulose, cellulose esters, cellulose ethers, ethylcellulose, ethyleneacrylic ester copolymers, polyvinyformal, acetal and butyral.

The novel process of this invention is particularly useful for removing surface defects from coated metal or coated wood substrates. For example, in the manufacture of automobiles, the final coat of paint is sanded to remove defects, to remove the scratches resulting from the sanding operation, the coating is subjected to the vapor treatment process of this invention which causes the coating to reflow to form a smooth, even, scratch-free surfaces. The automobile can be placed in a chamber containing solvent vapors or a portion of the finish can be spot repaired by using a solvent vapor gun which sprays heated solvent vapors onto the finish. The novel process of this invention is also useful in furniture manufacture to remove the surface defects of clear furniture lacquers. This novel process is used to remove surface defects from coated coils, molded plastic articles, and in particular, lenses for glasses, microscopes, telescopes and the like; finishes leather shoes and "Corfam" shoes.

The novel process of this invention is operative to remove the surface defects from a thermoplastic polymer coating regardless of the manner of application of the coating. The coating can be sprayed, electrostatically sprayed, dip-coated, flow-coated, roller-coated, extruded, electrocoated and the like. The thermoplastic coating can be applied from a paint, a lacquer, organosol or a latex and the coating can be clear or pigmented.

The following discussion is directed to the variety of the thermoplastic polymer coating compositions that are used as coatings on wood, metal, glass and plastic substrates and to which the process of this invention is applicable.

Coated substrates for which the novel process of this invention is particularly adavntageous are suitable primed metal substrates that have a clear or pigmented acrylic polymer coating. Preferred acrylic polymer coatings contain methyl methacrylate as the main constituent and may have polymerized with the methyl methacrylate up to 50% by weight of other copolymerizable lower alkyl esters of acrylic acid and methacrylic acid in which the alkyl group preferably contains 1–8 carbon atoms.

Typical examples of the copolymerizable lower alkyl acrylate esters and methacrylate esters are ethyl acrylate, propyl acrylate, butyl acrylate, 2-ethylhexyl acrylate and the like; ethyl methacrylate, propyl methacrylate, butyl methacrylate, hexyl methacrylate, N,N-diethylaminoethyl acrylate, and the like. Other copolymerizable monomers which can be used are acrylonitrile, styrene and vinyl acetate.

The acrylic polymer used to form the coating composition used in this invention can have pendent carboxyl constituents which are provided by $\alpha,\beta$-unsaturated carboxylic acid monomers which are copolymerized with the aforementioned methacrylate monomers. One preferred acrylic polymer used as a coating composition in this invention contains about 0.1–3% by weight, and preferably, 0.2–1% by weight, based on the weight of the polymer, of polymerized $\alpha,\beta$-unsaturated carboxylic acid units. Typically useful $\alpha,\beta$-unsaturated carboxylic acid monomers are methacrylic acid, acrylic acid, itaconic acid, ethylacrylic acid, propylacrylic acid, isopropylacrylic acid and homologues of these acids. Methacrylic acid and acrylic acid are preferred since these acids form particularly high quality coatings.

The acrylic polymers used for coating compositions in this invention may also contain pendent hydroxyl groups which are obtained by copolymerizing hydroxyl alkyl acrylate or a hydroxyl alkyl methacrylate with the methacrylate monomers. Preferred hydroxyl containing acrylic polymers have about 2–20% by weight of the acrylic polymer, and more preferably, about 5–15% by weight of the acrylic polymer, of hydroxyalkyl acrylate or methacrylate. These hydroxyl acrylic polymers are used to form the coated substrates that can be treated by the novel process of this invention. Typically useful hydroxyalkyl acrylates and methacrylates contain about 2–8 carbon atoms in the alkyl group and are, for example, hydroxyethyl acrylate, hydroxypropylacrylate, hydroxybutyl acrylate, hydroxyoctyl acrylate, and the like, hydroxyethyl, methacrylate, hydroxypropyl methacrylate, hydroxybutyl methacrylate, hydroxyhexyl methacrylate, hydroxyoctyl methacrylate, and the like.

Nitrogen containing acrylic and methacrylic esters, such as N,N-diethylamino ethyl methacrylate, 3-(2-

The pigment is separately blended and dispersed in a portion of the polymer solution using a standard ball mill for about 4–8 hours. The pigment dispersion is then mixed with the aforementioned ingredients to form a coating composition.

The resulting coating composition has a total solids content of 33%. The coating is diluted to spray viscosity (40 sec. No. 1 Zahn cup viscosity) using a thinner, of 22.5% acetone, 34.0% Cellosolve acetate, 43.5% toluene, and is then sprayed onto 25 separate steel panels each primed with a 1.5 mil thick epoxy resin primer pigmented with iron oxide, aluminum silicate and barytes. The spray coatings are baked for 30 minutes at 150° C., giving a clear dry coating about 1.8 mil thick.

The gloss at 20° of each of the panels is measured on a Glossimeter-Colorimeter according to ASTM-D-523. The 20° gloss of each of the panels is about 40–70. The coating on each panel is then wet sanded with No. 600 grit sandpaper and mineral spirits for several seconds. Each of the sanded panels is then exposed to a different type of solvent vapor or a vapor of a mixture of solvents which reduces the reflow of temperature of the coating and the reflow of each panel is then rated and the panel is then baked to harden the coating. The gloss is again checked by the above method. The results of these tests are in Table I.

The following test procedure is used to determine the reflow of a particular solvent on the sanded coated panels. A heated vapor generating flask containing solvent is connected to a vacuum oven. The coated panel is placed in the oven which is heated to a given exposure temperature and the oven is evacuated to a pressure of less than 1 inch mercury. The valve to the vacuum is shut and the valve to the solvent generating flask is opened and solvent vapors are admitted until the desired vapor pressure is reached in the oven. The oven is brought to atmospheric pressure by admitting air into the oven. The panel is then exposed to the solvent vapor for 1 minute. The panel is removed from the oven and examined and rated for reflow. The panels are then baked at 75° C. for 10 minutes to harden the coating and the gloss of the panels is again measured.

Example 2

A pigmented lacquer coating composition is formulated by blending the following ingredients:

| | Parts by weight |
|---|---|
| Polymethyl methacrylate | 15.22 |
| Butylbenzyl phthalate | 5.91 |
| Bentone 34 pigment (dimethyl dioctobenzyl ammonium bentonite) | 1.27 |
| Titanium Oxide Pigment | 10.55 |
| Solvent (toluene, acetone, Cellosolve acetate blend) | 67.05 |
| Total | 100.00 |

The resulting coating composition has a polymer solids content of 25%. The coating is then sprayed on a steel panel primed with 1.5 mil thick epoxy resin primer pigmented with iron oxide, aluminum silicate and barytes. The sprayed panel is then baked for 30 minutes at 150° C. giving a coating about 1.8 mils thick. The coating on the panel is wet sanded with No. 600 grit sandpaper and mineral spirits as in Example 1. The panel is then exposed to a vapor mixture of methylene chloride/air, partial pressure 15/15 inches mercury for 1 minute at 25° C. using the same equipment and procedure as in Example 1. The panel is then baked at 75° C. for 10 minutes to harden the coating. The reflow of the coating is excellent since none of the scratches from the sanding of the coating are visible.

Example 3

A coating composition is formed by blending the following ingredients using standard mixing techniques:

| | Parts by weight |
|---|---|
| Polymethyl methacrylate | 13.75 |
| Copolymer of methyl methacrylate/methacrylic acid (99/1) | 1.46 |
| Titanium dioxide | 14.35 |
| Cellulose acetate butyrate | 5.77 |
| Butylbenzyl phthalate | 8.40 |
| Acetone | 15.08 |
| Toluene | 29.11 |
| Cellosolve acetate | 11.94 |
| Xylene | 0.14 |
| Total | 100.00 |

The resulting coating composition has a polymer solids content of 43.8%. The coating is diluted as in Example 1, then sprayed on a steel panel primed with a 1.5 mil thick epoxy resin primer pigmented with iron oxide, aluminum silicate and barytes. The sprayed panel is then baked for 30 minutes at 150° C. giving a coating about 1.8 mils thick. The coating on the panel is then wet sanded with mineral spirits as in Example 1. The panel is then exposed to a vapor mixture of methylene chloride/air, partial pressure 15/15 inches mercury for 1 minute at 25° C. using the same equipment and procedure as in Example 1. The panel is then baked at 75° C. for 10 minutes to harden the coating.

The reflow of the coating is rated as 10 and the gloss at 20°, measured as in Example 1 with a Glossimeter, is 49. The scratches in the coating resulting from the wet sanding are no longer visible and the high gloss and excellent appearance of the coating indicate that this process is useful and very effective providing a smooth, high gloss, scratch-free coating on auto bodies and the like.

Example 4

A coating composition formed by blending the following ingredients by standard mixing techniques:

| | Parts by weight |
|---|---|
| Polymethyl methacrylate | 4.36 |
| Copolymer of methyl methacrylate/N,N-diethylaminoethyl methacrylate (weight ratio 99/1) | 6.51 |
| Terpolymer of methyl methacrylate/butyl acrylate/N,N - diethylaminoethylmethacrylate (weight ratio 81/18/1) | 7.00 |
| Coconut oil/ethylene glycol/phthalic anhydride alkyd resin | 7.06 |
| Carbon black pigment | 0.52 |
| Cellulose acetate butyrate | 6.14 |
| Acetone | 11.96 |
| Toluene | 40.20 |
| Isopropyl alcohol | 10.97 |
| Cellosolve acetate | 5.20 |
| Xylene | .06 |
| Total | 99.98 |

The resulting black coating composition has a polymer solids content of 31.6%. The coating is diluted as in Example 1, is then sprayed on a steel panel primed with a 1.5 mil thick epoxy resin primer pigmented with iron oxide, aluminum silicate and barytes. The sprayed panel is then baked for 30 minutes at 150° C. giving a coating about 1.8 mils thick. The coating on the panel is then wet sanded with mineral spirits as in Example 1. The panel is then exposed to a vapor mixture of methylene chloride/air, partial pressure 15/15 inches mercury for 1 minute at 25° C. using the same equipment and procedure as in Example 1. The panel is then baked at 75° C. for 10 minutes to harden the coating.

The reflow of the coating is rated as 10 and the gloss at 20°, measured as in Example 1 with a Glossimeter, is 82. The scratches in the coating resulting from the wet sanding are not visible and the high gloss and excellent appearance of the coating indicate that the process is useful and effective for providing an acceptable black coating, for example, on auto bodies.

Example 5

A latex is formulated from a butyl methacrylate/methyl methacrylate/methacrylic acid terepolymer weight ratio 50/43/7 and has a polymer solids content of 25%. The latex is sprayed onto a steel panel primed with a 1.5 mil thick alkyd primer pigmented with iron oxide, aluminum silicate and barytes. The latex coating is air dried for about two hours giving a coating about 1.5 mils thick.

The coating on the panel is wet sanded with No. 600 grit sandpaper and mineral spirits as in Example 1. The panel is then exposed to methylene chloride vapors at a partial pressure of 24 inches of mercury for about 1 minute at 45° C. using the same procedure as in Example 1. The panel is then air dried.

The reflow of the coating is rated as good since none of the scratches from the sanding of the coating are visible after the above reflow treatment.

Example 6

A coating composition is formulated by blending the following ingredients:

| | Parts by weight |
|---|---|
| Polymethyl methacrylate | 21.10 |
| Cellulose acetate butyrate | 8.00 |
| Butylbenzyl phthalate | 10.90 |
| Silicone | 0.25 |
| Toluene | 38.93 |
| Acetone | 16.72 |
| Cellulose acetate | 4.10 |
| Total | 100.00 |

The resulting coating composition is further diluted with the solvent mixture used in Example 1 to a solution with a content of 20% (No. 15 Parlin cup viscosity of 5–70). The coating is sprayed onto a mahogany wood substrate primed with nitrocellulose sealer, a filler and a stain. The sprayed coating is dried for 30 minutes at 60° C. to give a clear dry coating about 2 mils thick.

The coating is sanded with No. 600 grit sandpaper and naphtha for less than a minute. The panel is then exposed to methylene chloride solvent at a partial pressure of 15 inches mercury for 30 minutes at 44° C. using the same procedure as Example 1. The sample is removed and dried by heating at 25° C. for 30 minutes. The reflow of the coating is excellent. The scratches from sanding are no longer visible and the gloss measured at 20° with a Glossimeter is 50.8 which is a very acceptable level of gloss for a furniture finish.

Example 7

A 36% solids polytetrafluoroethylene aqueous dispersion is coated onto an aluminum panel primed with about a ¼ mil layer of coating composition C of Example 1, U.S. Patent 2,562,118 issued July 24, 1951. The resulting coated panel is baked at 400° C. for about 15 minutes. The panel is then exposed to a perfluorokerosene vapor at a partial pressure of 29 inches mercury for about 30 minutes at 350° C. using the procedure of Example 1. The resulting fluorocarbon coating exhibits increased strain resistance to cooking oils in comparison to panels which were not treated with solvent vapors.

Example 8

The coating composition prepared in Example 4 is sprayed on a steel panel primed with a 1.5 mil thick epoxy resin primer pigmented with iron oxide. The sprayed panel is baked for 30 minutes at 150° C. giving a dried coating about 1.8 mils thick. The panel is then wet sanded with No. 600 grit sand paper and mineral spirits.

The following solvent mixture is charged into a conventional solvent pressure vessel: 88% by volume methylene chloride, 7.6% by volume methyl Cellosolve and 4.4% by volume Cellosolve acetate. A solvent vapor gum is used containing a heater unit. The solvent is under 90–100 pounds per square inch pressure in the vessel and a vapor flow rate of 4.6–4.7 gallons per hour is used and the temperature of the vapor at the exit of the gun is about 170° C. The hot solvent vapors are sprayed onto the panel and as the solvent vapor is sprayed, it is mixed with air. The panel is then dried to harden the coating. The resulting panel has no visible scratches and an excellent gloss.

TABLE I

| Solvent description | Exposure temp., °C. | Partial pressure, in. of Hg | Reflow rating | 20° gloss after exposure |
|---|---|---|---|---|
| Methylene chloride | 45 | 20 | 10 | 43 |
| Acetone | 45 | 14 | 10 | 39 |
| Benzene | 45 | 7 | 8 | 51 |
| Acetonitrile | 45 | 6 | 9 | 48 |
| Tetrahydrofuran | 45 | 11 | 10 | 42 |
| Methanol | 45 | 10 | 9 | 53 |
| Dichloromethane (b.p.=40.2° C.) | 45 | 22 | 9 | 66.6 |
| Carbon tetrachloride (b.p.=76.8° C.) | 90 | 22 | 9 | 51.9 |
| 1,2-dichloroethane (b.p.=83.5° C.) | 100 | 30 | 9 | 67.5 |
| Trichloroethylene (b.p.=87.2° C.) | 75 | 18 | 9 | 44.8 |
| 1,1,2-trichloroethane (b.p.=113.5° C.) | 120 | 30 | 10 | 72.7 |
| Ethyl acetate (b.p.=77.2° C.) | 60 | 8 | 10 | 46.2 |
| Butyl acetate (b.p.=126.1° C.) | 80 | 6 | 9 | 45.9 |
| Methyl methacrylate | 80 | 10 | 9 | 49.6 |
| Toluene (b.p.=110.6°C.) | 120 | 20 | 9 | 70.8 |
| Methyl isobutyl ketone | 120 | 20 | 7 | 52.8 |
| Dimethyl formamide (b.p.=152° C.) | 130 | 15 | 9 | 61.9 |
| Trifluoroacetic acid | 80 | 5 | 9 | 41.4 |

| Solvent mixture I | II | Exposure temp., °C. | Partial pressure, in. of Hg | Reflow rating | 20° gloss after exposure |
|---|---|---|---|---|---|
| Water | Butyl acetate | 120 | 10/20 | 8 | 60.7 |
| Methanol | Methylene chloride | 25 | 7/11 | 8 | 57.7 |
| Hexane | do | 25 | 6/12 | 9 | 49.0 |
| Methyl isobutyl ketone | do | 120 | 10/20 | 7 | 33.1 |
| Toluene | Acetone | 120 | 20/5 | 7 | 71.3 |
| Do | do | 120 | 10/10 | 7 | 48.8 |

Reflow rating: 10—Excellent; 7–10—Acceptable; 0–6—Unacceptable; 0—Very poor, scratches still visible.

I claim:

1. A process for treating an article consisting essentially of thermoplastic methacrylate polymer coating firmly adhered to a metal substrate which comprises
   (1) exposing the polymer surface of said article to a mixture of air and a viscosity reducing vapor for the polymer for about 30 seconds to 5 minutes, and the partial pressure range of said vapor being at least 0.5 inch of mercury and up to 0.99 time the saturation vapor pressure, at the temperature at which said article is being exposed which is about 20° C. to 200° C.; wherein the viscosity reducing vapor is selected from the group consisting of methylene chlomethylacryloxyethyl) - 2,2 - spirocyclohexyl oxazolidine (MESO) and the like can be used to form the methacrylate polymers used for coating compositions.

Coating compositions of acrylic graft copolymers can also be treated according to the novel process of this invention. These graft copolymers can be represented by the recurring unit structure A–B, where A is the backbone segment of the molecule and B is a graft segment, attached to A by a chemical bond.

The A portion of the molecule can be further represented by an $a$–$b$ structure, i.e. the backbone is a copolymer composed of monomer units ($a$) and monomer units ($b$), where the ($a$) portion, i.e. the ($a$) monomer units, of the A segment is composed of monomer units from monomers of the general structure Formula 1

$$CH_2=\overset{R}{\underset{|}{C}}COOR_1$$

where

R is H, $CH_3$ or $-CH_2CH_3$, and
$R_1$ is an alkyl or cycloalkyl group of 1 through 18 carbon atoms.

These monomers are esters of acrylic acid, methacrylic acid and ethacrylic acid. Lower alkyl methacrylates, wherein the alkyl group has 1 through 4 carbons, such as methyl methacrylate, are especially preferred.

The ($a$) portion should constitute at least 85% by weight of the total A segment.

Although ordinarily the ($a$) portion will be composed entirely of these acrylic units referred to above, up to about 50% of its weight can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxyethyl)-2,2-spirocyclohexyl-oxazolidine, and the like.

The ($b$) portion, i.e. the monomer units ($b$), of the A backbone segment provides the potential active grafting sites, i.e. points for attachment for the B branch segment or segments.

Formula 2

$$-\overset{Y}{\underset{|}{C}}-\overset{|}{\underset{|}{C}}-\\ \phantom{-C-}\overset{|}{X}\\ \phantom{-C-}\overset{|}{Z}$$

where

X can be $$-\overset{O}{\overset{\|}{C}}-O-$$

(the carbon atom in this group being attached directly to the backbone), $$-O-, \text{ or } -\overset{O}{\overset{\|}{C}}-$$

Y can be hydrogen, $-CH_3$ or $-CH_2CH_3$;
Z can be $$-CH_2-\overset{R_2}{\underset{|}{C}}=CH-R_3$$

where $R_2$ and $R_3$ are Y $$-CH_2-\!\!\!\!\bigcirc\!\!\!\!-R_4, \quad -CH_2-N\!\!\begin{array}{c}\diagup R_4\\ \diagdown R_5\end{array}, \quad -CH_2-CH_2-N\!\!\begin{array}{c}\diagup R_4\\ \diagdown R_5\end{array}$$

where $R_4$ and $R_5$ are H or alkyl of 1 through 4 carbon atoms, or $$-CH_2-CH_2-O-R_6$$

where $R_6$ is alkyl of 1 through 4 carbon atoms;

$$-CH_2CH_2-O-\overset{O}{\overset{\|}{C}}-\underset{\underset{Y}{|}}{C}=CH_2$$

$$-CH_2-\overset{H}{\underset{|}{C}}-CH_2O\overset{O}{\overset{\|}{C}}-\underset{\underset{OH}{|}}{\overset{Y}{\underset{|}{C}}}=CH_2$$

where Y has the same meaning as above;

$$-CH_2\underset{\underset{OH}{|}}{C}-CH_2NHCH_2CH=CH_2$$

$$-CH_2-\overset{H}{\underset{\underset{OH}{|}}{C}}-CH_2O\overset{O}{\overset{\|}{C}}-CH_2-SH$$

or $$-CH_2-CH_2-O-\overset{O}{\overset{\|}{C}}-CH=CH-COOH$$

provided that when
X is $$-\overset{O}{\overset{\|}{C}}-$$

Z can be $-H$ or $-NH-CH_2-CH=CH_2$ and provided further that the combined $-X-Z$ group can be $$\bigcirc\!\!\!\!-\!\!\!\!\bigcirc\\ \phantom{xx}|\\ CH_3-\overset{|}{\underset{\underset{H}{|}}{C}}-CH_3$$

Allyl methacrylate and diethylaminoethyl methacrylate are preferred.

The B segment is the branch segment or branch segments of the graft copolymer. Like the ($a$) portion of the polymeric backbone segment A, the B segment of the graft copolymer molecule is composed of monomer units from monomers of the general structure of Formula 1 above.

As in the case of the ($a$) portion, the B portion of the graft copolymer molecule will ordinarily be composed entirely of acrylic units as mentioned above. However, up to about 50% by weight of the B portion can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxyethyl)-2,2-spirocyclohexyl-oxazolidine, and the like.

Especially preferred B segments are composed of 2-ethylhexyl acrylate units, butyl acrylate units, or combinations of the two.

The B portion of the graft copolymer is always the branch segment and will not contain any significant amount of a component which provides active grafting sites such as previously indicated by ($b$).

As will readily be understood by persons in this art, preparation of graft copolymers described above will typically result in a mixture of polymer molecules, of varying number of grafted side chains per molecule. The average number of grafted B segments per A or backbone segment is ordinarily 0.5–5, preferably 1–2.

About 15–72% by weight, and preferably, about 20–40% by weight, based on the weight of the film-forming material of the coating composition, of cellulose acetate butyrate can be used with the aforementioned acrylic polymers to form the coating compositions that can be used to form coated substrates that can be treated by the novel process of this invention. Preferably, the cellulose acetate butyrate used in this invention has a viscosity of about 0.1–20.0 seconds and more preferably, a viscosity of 2-5 seconds determined according to the method of ASTM-D-1343-56.

Preferably, organic plasticizers in amounts up to 10% by weight, based on the weight of film-forming ingredients, are used in the aforementioned methacrylate coating compositions. More preferably, about 2-8% by weight of organic plasticizer is used which provides a coating composition with excellent durability. The following are typically useful plasticizers: epoxidized soya bean oil, oil free and oil modified alkyds and polyesters, such as polyorthophthalate esters, polyalkylene adipate esters or polyarylene adipate esters, butyl benzyl phthalate, dibutyl phthalate, triphenyl phosphate, 2-ethylhexylbenzyl, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl, butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl)phthalate. One preferred plasticizer of this group is butylbenzyl phthalate since it forms a coating with excellent balance of properties.

The following preferred methacrylate coating composition, when used on suitably primed metal substrate, gives excellent scratch and mar-free coatings when treated by the process of this invention:

| | Weight percent |
|---|---|
| Polymethyl methacrylate | 10-20 |
| Copolymer of methyl methacrylate/N,N-diethylaminoethyl methacrylate | 10-20 |
| Copolymer of methyl methacrylate/butyl acrylate | 25-35 |
| Cellulose acetate butyrate 1-5 sec. viscosity | 15-25 |
| Coconut oil/ethylene glycol/phthalate anhydride alkyd resin | 20-25 |

Preferably, the aforementioned methacrylate coating compositions have a solids content of film-forming ingredients of about 20-50% by weight, and more preferably, about 30-40% by weight. Examples of the volatile solvents and diluents which are used in formulating these coating compositions are toluene, xylene, butyl acetate, acetone, methylisobutyl ketone, methylethyl ketone, butyl alcohol, and other aliphatic cycloaliphatic and aromatic hydrocarbons, esters, ethers, ketones and alcohols, such as are conventionally used in coating compositions. One preferred solvent is a mixture of toluene, methyl isobutyl ketone and methylethyl ketone.

Preferably, these methacrylate polymer coating compositions are pigmented in the amounts of 0.1-20.0% pigment volume concentration, preferably, a pigment volume concentration of about 0.3-6.0% is used. Examples of the great variety of pigments which are used are: metallic oxides, preferably titanium dioxide, zinc oxide, and the like, metal hydrorides, metal flakes, chromates, such as lead chromate, sulfides, sulfates, carbonates, carbon black, silica, talc, china clay, organic dyes, lead, iron blues, organic reds, maroons, organic dyes and lakes and the like.

The process of this invention is also applicable to wood substrates that have been coated with a methacrylate ester containing polymer to remove surface defects. Generally, coatings of methacrylate esters for wood substrates contain about a major portion of methyl methacrylate, and may contain one or more of the aforementioned acrylic or methacrylic esters. One preferred composition contains 70-80% by weight of methylmethacrylate and 20-30% by weight of cellulose acetate butyrate.

Polymethacrylate ester having pendent carboxyl groups that are useful as coatings for wood substrates can be reacted with an alkylene imine such as taught in Simms U.S. 3,261,796, issued July 19, 1966. Coatings of these iminated polymethacrylate esters can also be treated with the novel process of this invention to remove surface defects.

The process of this invention is particularly applicable to removing surface defects from wood or metal substrates coated with a nitrocellulose composition. Preferred vapor reducing solvents for nitrocellulose coatings are methylene chloride and carbon tetrachloride.

Coatings of alkyd resins on properly primed wood and metal substrates which are not highly crosslinked can be advantageously treated by the process of this invention to remove surface defects. Typical alkyd resins are formed from a drying oil, such as linseed oil, coconut oil, dehydrated castor oil, soya oil, a glycol, such as ethylene glycol, propylene glycol, butane diol, diethylene glycol and the like and dibasic acid, such as phthalic acid, maleic acid, sebacic acid, adipic acid, succinic acid and the like.

Other coating compositions which the process of this invention can be advantageously used are, for example, ethylene/vinyl acetate copolymers containing about 40-70% by weight of vinyl acetate and 60-30% by weight ethylene; copolymer of vinyl acetate/vinyl chloride, polyvinyl chloride, polyvinylidene chloride, polysiloxanes, polyureas, polyurethanes, polycarbonates, polyesters, polystyrenes and copolymers of sytrene, such as styrene/butadiene copolymer, butadiene/acrylonitrile copolymers and the like.

Fluorocarbon polymer coatings, such as polytetrafluoroethylene, on metal substrates when treated by the novel process of this invention with fluorocarbon vapors, such as tetrafluoroethylene, vinyl fluoride, vinylidene fluoride, and the like, have improved resistance to staining. This is particularly desirable in cookware, such as frying pans. A decrease in surface viscosity is not noted with fluorocarbon polymer coatings when the coating is treated by the process of this invention. However, the aforementioned beneficial results do occur indicating the usefulness of the process of this invention.

One skilled in the art can readily determine the commercial advantages of the novel process of this invention and can recognize that a variety of equipment can be used to carry out this novel process. For example, if the novel process of this invention is used on an auto assembly line, the object which may be an auto body or an auto part would be placed on an endless conveyor and the object would be passed through a chamber cointaining the desired partial pressure of viscosity reducing vapor and then the object would pass through an oven to dry the coating. Also, a vapor gun which sprays heated solvent vapors can be used to spot repair a defective portion of the finish.

The following examples illustrate the invention.

Example 1

A coating composition is formulated by blending the following ingredients using standard mixing and blending techniques for preparing a paint

| | Parts by weight |
|---|---|
| Polymethyl methacrylate | 5.333 |
| Copolymer of methyl methacrylate/N,N-diethylaminomethyl methacrylate (weight ratio 99/1) | 3.970 |
| Copolymer of methyl methacrylate/butyl acrylate (weight ratio 82/18) | 9.224 |
| Cellulose acetate butyrate | 6.091 |
| Coconut oil/ethylene glycol/phthalic anhydride alkyd resin | 6.566 |
| Titanium dioxide pigment | 11.000 |
| Butylbenzyl phthalate | 0.270 |
| Acetone | 24.277 |
| Toluene | 35.963 |
| Cellosolve acetate | 4.660 |
| Mineral spirits (145-215° C. boiling range) | 0.119 |
| Xylene | 1.690 |
| Aromatic hydrocarbon solvent (150-190° C. boiling range) | 0.119 |
| Total | 109.282 | ride, acetone, benzene, acetonitrile, tetrahydrofuran, methanol, carbon tetrachloride, dichloroethane, trichloroethylene, trichloroethane, ethyl acetate, butyl acetate, methyl methacrylate, toluene, methyl isobutyl ketone, dimethyl formamide, dimethyl acetamide, trifluoroacetic acid, Cellosolve acetate, methyl Cellosolve acetate, and mixtures thereof;

(2) absorbing sufficient vapor into the polymer surface of said article to reduce the viscosity of the thermoplastic polymer surface of said article to a viscosity of 100,000–1,000,000 poises;

(3) allowing the surface polymer to reflow to form a smooth even surface; and (4) evaporating the absorbed vapors on the surface of the polymer until the polymer surface is dry.

2. The process of claim 1 in which the methacrylate polymer coating comprises a lower alkyl methacrylate polymer.

3. The process of claim 1 in which the methacrylate polymer coating comprises a polymethyl methacrylate.

4. The process of claim 1 in which the methacrylate polymer coating comprises a copolymer of a lower alkyl methacrylate and a lower alkyl acrylate.

5. The process of claim 4 in which the lower alkyl group of said copolymer is of a $C_1$ to $C_8$ saturated aliphatic monohydric primary alcohol.

6. The process of claim 1 in which the methacrylate polymer is a graft copolymer having a backbone (A) and one or more side chains (B), the backbone (A) being a polymeric segment of units (a) and up to 15% by weight of units (b), and (b) units providing available active grafting sites for graft polymerization, and each side chain (B) above being a polymeric segment, (A) and (B) being different from each other, and (a) and (B) each being composed of at least 50% by weight of units of esters of acrylic, methacrylic and/or ethacrylic acid.

References Cited

UNITED STATES PATENTS

| 2,651,811 | 9/1953 | Coney | 117—138.8 |
|---|---|---|---|
| 2,771,378 | 11/1956 | Motter | 117—63 |
| 2,138,578 | 11/1938 | Hershberger | 117—63 |
| 2,661,310 | 12/1953 | Page et al. | 117—132 |
| 2,294,479 | 9/1942 | Peter | 117—148 |
| 2,650,885 | 9/1953 | Hudson | 117—148 |
| 3,437,727 | 8/1969 | Boyhan et al. | 117—63 |
| 3,020,661 | 2/1962 | Miller et al. | 117—63 |
| 3,443,008 | 5/1969 | Boyhan et al. | 156—2 |
| 3,379,549 | 4/1968 | Playfair | 117—63 |

WILLIAM D. MARTIN, Primary Examiner

W. R. TRENOR, Assistant Examiner

U.S. Cl. X.R.

117—2 R, 106 R, 132 C; 156—2; 264—341